United States Patent
Weinmann

(12) 
(10) Patent No.: US 6,629,006 B1
(45) Date of Patent: Sep. 30, 2003

(54) METHOD AND DEVICE FOR PUTTING TOGETHER AND ASSEMBLING CARD PLATES AND CARD RACKS

(75) Inventor: Karlheinz Weinmann, Utting (DE)

(73) Assignee: Bowe Systec AG, Augsburg (DE)

( * ) Notice: Subject to any disclaimer, the term of this patent is extended or adjusted under 35 U.S.C. 154(b) by 0 days.

(21) Appl. No.: 09/446,000

(22) PCT Filed: Jun. 15, 1998

(86) PCT No.: PCT/EP98/03604

§ 371 (c)(1),
(2), (4) Date: Dec. 17, 1999

(87) PCT Pub. No.: WO99/07561

PCT Pub. Date: Feb. 18, 1999

(30) Foreign Application Priority Data

Aug. 8, 1997 (DE) .......................................... 197 34 483

(51) Int. Cl.⁷ ............................................. G06F 19/00
(52) U.S. Cl. ....................................... 700/100; 700/221
(58) Field of Search ................................ 700/100, 109, 700/221; 53/206, 411, 55; 235/380; 493/233, 216

(56) References Cited

U.S. PATENT DOCUMENTS

| 4,429,217 | A |   | 1/1984  | Hill et al. ................... 235/380 |
| 4,573,711 | A | * | 3/1986  | Hyde ........................... 283/98 |
| 5,266,781 | A | * | 11/1993 | Warwick et al. ............. 235/375 |
| 5,433,364 | A | * | 7/1995  | Hill et al. ...................... 225/96 |
| 5,538,232 | A | * | 7/1996  | Long ........................... 270/1.03 |
| 5,541,395 | A | * | 7/1996  | Hill et al. .............. 235/462.13 |
| 5,715,653 | A | * | 2/1998  | Weinmann et al. ........... 53/411 |

FOREIGN PATENT DOCUMENTS

| DE | 19508282 | 3/1995 |
| DE | 19533444 | 3/1995 |

* cited by examiner

Primary Examiner—Albert W. Paladini
Assistant Examiner—Chad Rapp
(74) Attorney, Agent, or Firm—Glenn Patent Group; Michael A. Glenn; Kirk D. Wong

(57) ABSTRACT

In a method and an apparatus for bringing together and joining plastic cards, which are provided with an identification mark, and printed card carriers associated with the respective plastic cards, data sets with identification marks, which are associated with the plastic cards, are first provided and each data set has associated therewith a print job number. The plastic cards and the printed card carriers, which have a print job number printed thereon, are provided in a presorted sequence and the identification mark of a plastic card and the print job number of a card carrier are detected. On the basis of the data set provided, the plastic card, whose identification mark has been read, has associated therewith a print job number, whereupon it is determined on the basis of this print job number whether the plastic card which is about to be joined and the card carrier match one another. If this is the case, the plastic card and the card carrier are brought together and joined.

13 Claims, 4 Drawing Sheets

METHOD AND DEVICE FOR PUTTING TOGETHER AND ASSEMBLING CARD PLATES AND CARD RACKS

BACKGROUND OF THE INVENTION

1. Field of the Invention

The present invention refers to a method and an apparatus for bringing together and joining plastic cards and card carriers, and in particular to a method and an apparatus operating in the so-called off-line mode.

2. Description of the Background Art

It is generally possible to automatically join (apply) a variable number of plastic cards, such as thick plastic cards, type CR-80, to card carriers by means of known systems. The card carriers having applied thereto the plastic cards are then packed into envelopes, e.g. in an enveloping station, and either deposited in a scalelike mode of arrangement or subjected to further treatment, such as sorting or encircling by a plastic strip.

In the case of a known method and a known apparatus, presorted and personalized plastic cards are applied to presorted and personalized card carriers. The term "personalized" means in this connection that the plastic card and the card carrier, respectively, have already been provided with the necessary data, such as name, address etc. The card carriers can in this case by supplied from a stack of continuous sheets or from a stack of single sheets.

Such a known apparatus for applying plastic cards and card carriers is provided with a turret means comprising four magazines. Individual plastic cards are discharged from this turret means and supplied to a reading device. In the reading device, an identification number (ID number) of the plastic card is read and a processing means (VE) detects and stores the identification number. Subsequently, the plastic card is conducted to an applicator. The applicator has additionally supplied thereto a card carrier which is contained in a stack comprising the card carriers in a presorted form. The card carriers have already been provided with the relevant data. Prior to supplying the card carrier to the applicator, the identification number printed on the card carrier is read and compared with the identification number of the card which is about to be joined to the card carrier in the applicator. If the identification numbers correspond, the plastic card and the card carrier will be joined in the applicator.

Such an apparatus is disadvantageous insofar as the identification number is present on the card carrier as well as on the plastic card itself; this identification number can unequivocally be associated with the data related to a specific person which are printed on the card carrier. Making use of the identification number, it is e.g. possible to access a data base in which the personal data of the card owners are stored. It follows that the above-described known system permits access to personal data of a person, e.g. by unauthorized access to a data base by third parties.

DE 195 08 282 C1 discloses a bringing-together and joining means which avoids the above-described disadvantages with regard to unsatisfactory data privacy protection. Instead of the identification number, a so-called print job number is used; before the card and the carrier are joined in the applicator, this print job number is used for determining whether the card and the carrier correspond. The means described in this DE 195 08 282 C1 operates in a so-called on-line mode, i.e. that, instead of providing preprinted card carriers in this means, a printer is provided which prints the necessary data on the card carriers and which supplies the thus printed card carrier to th applicator where it is then determined whether the plastic card which is about to be joined and the card carrier which is about to be joined match one another.

SUMMARY OF THE INVENTION

It is the object of the present invention to provide an improved method and an improved apparatus for bringing together and joining a plastic card and a card carrier, which operate in an off-line mode.

The present invention is a method of bringing together and joining plastic cards, which are provided with an identification mark, and printed card carriers associated with the respective plastic cards, data sets with the identification marks, which are associated with the plastic cards, and with a print job number associated with each identification mark being provided, wherein this method has the following steps:

providing in order the plastic cards;

providing in order the printed card carriers which are each provided with a print job number;

detecting the identification mark of a plastic card;

detecting the print job number of a card carrier;

determining on the basis of the data set whether the plastic card which is about to be joined and the card carrier match one another; and if the plastic card and the card carrier match one another, bringing them together and joining them.

The present invention is a method of bringing together and joining plastic cards, which are provided with an identification mark, and printed card carriers associated with the respective plastic cards, wherein this method has the following steps:

providing data sets with identification marks which are associated with the plastic cards;

associating a print job number with each data set;

providing in order the plastic cards;

providing in order the printed card carriers which are each provided with a print job number;

detecting the identification mark of a plastic card;

detecting the print job number of a card carrier;

determining on the basis of the data set whether the plastic card which is about to be joined and the card carrier match one another; and if the plastic card and the card carrier match one another, bringing them together and joining them.

The present invention is a method of bringing together and joining plastic cards, which are provided with an identification mark, and printed card carriers associated with the respective plastic cards, wherein this method has the following steps:

providing data sets with identification marks which are associated with the plastic cards;

associating a print job number with each data set;

providing in order the plastic cards;

providing in order the printed card carriers which have already printed thereon a print job number;

detecting the identification mark of a plastic card;

associating, on the basis of the data set, a print job number with the plastic card whose identification mark has been detected;

detecting the print job number of a card carrier;

determining, on the basis of the print job number, whether the plastic card which is about to be joined and the card carrier match one another; and if the plastic card and the card carrier match one another, bringing them together and joining them.

The present invention is a method of bringing together and joining plastic cards, which are provided with an identification mark, and printed card carriers associated with the respective plastic cards, wherein this method has the following steps:

a) a data set production step comprising the following steps:
  a1) providing the plastic card;
  a2) detecting an identification mark of the plastic card; and
  a3) producing a data set by reading a data base by means of the identification mark and associating a print job number with the data read from the data base, the print job number being not unequivocally associated with the read data related to a specific person; and b) a bringing-together and joining step comprising the following steps:
  b1) providing a printed card carrier which is provided with a print job number;
  b2) providing the plastic card;
  b3) detecting the print job number of the printed card carrier;
  b4) detecting the identification mark of the plastic card;
  b5) determining, on the basis of the data set specified by the identification mark, whether the print job number contained in the specified data set corresponds to the detected print job number of the printed card carrier; and
  b6) if the print job numbers correspond, bringing the plastic card and the card carrier together and joining them.

The present invention is an apparatus for bringing together and joining plastic cards, which are provided with an identification mark, and printed card carriers associated with the respective plastic cards, this apparatus having:

a means for providing in order the plastic cards;

a means for providing in order the printed card carriers having a print job number printed thereon;

a first detection means detecting the identification marks of the plastic cards;

a second detection means detecting the print job number of a card carrier;

a processing unit containing data sets with identification marks, a print job number being associated with each data set, and the processing unit determining on the basis of the data set whether the plastic card which is about to be joined and the card carrier match one another; and a bringing-together and joining means which brings the plastic card and the card carrier together and joins them if this plastic card and this card carrier match one another.

The present invention is an apparatus for bringing together and joining plastic cards, which are provided with an identification mark, and printed card carriers associated with the respective plastic cards, this apparatus having:

a means for providing in order the plastic cards;

a means for providing in order the printed card carriers having a print job number printed thereon;

a first detection means detecting the identification mark of a plastic card;

a second detection means detecting the print job number of a card carrier;

a processing unit containing data sets with identification marks, a print job number being associated with each data set, and the processing unit associating a print job number on the basis of the data set of the plastic card whose identification mark has been detected and determining whether the print job numbers of the plastic card and of the card carrier match one another; and a bringing-together and joining means which brings the plastic card and the card carrier together and joins them if this plastic card and this card carrier match one another.

The present invention is an apparatus for bringing together and joining plastic cards, which are provided with an identification mark, and printed card carriers associated with the respective plastic cards, this apparatus having:

a means for producing a data set having the following features:
  a carrier means in which the plastic card is contained;
  a detection means which detects the identification mark of the plastic card;
  a data base means containing data in dependence upon the identification mark; and
  a processing unit causing the data base to be accessed by means of the identification mark and producing a data set by reading the data base and by associating a print job number with the data read;

a bringing-together and joining means having the following features:
  a plastic card holder in which the plastic card is contained;
  a card carrier holder in which a printed card carrier is contained, the printed card carrier being provided with a print job number;
  a means for detecting the print job number on the printed card carrier;
  a means for detecting the identification mark of the plastic card;
  a processing unit determining, on the basis of the data set specified by the detected identification mark, whether the print job number contained in the specified data set corresponds to the print job number of the printed card carrier; and
  a means which brings the plastic card and the card carrier together and joins them if the print job numbers correspond.

BRIEF DESCRIPTION OF THE DRAWINGS

In the following, preferred embodiments of the present invention will be described in detail making reference to the drawings enclosed, in which.

DESCRIPTION OF THE PREFERRED EMBODIMENTS

Figure 1:
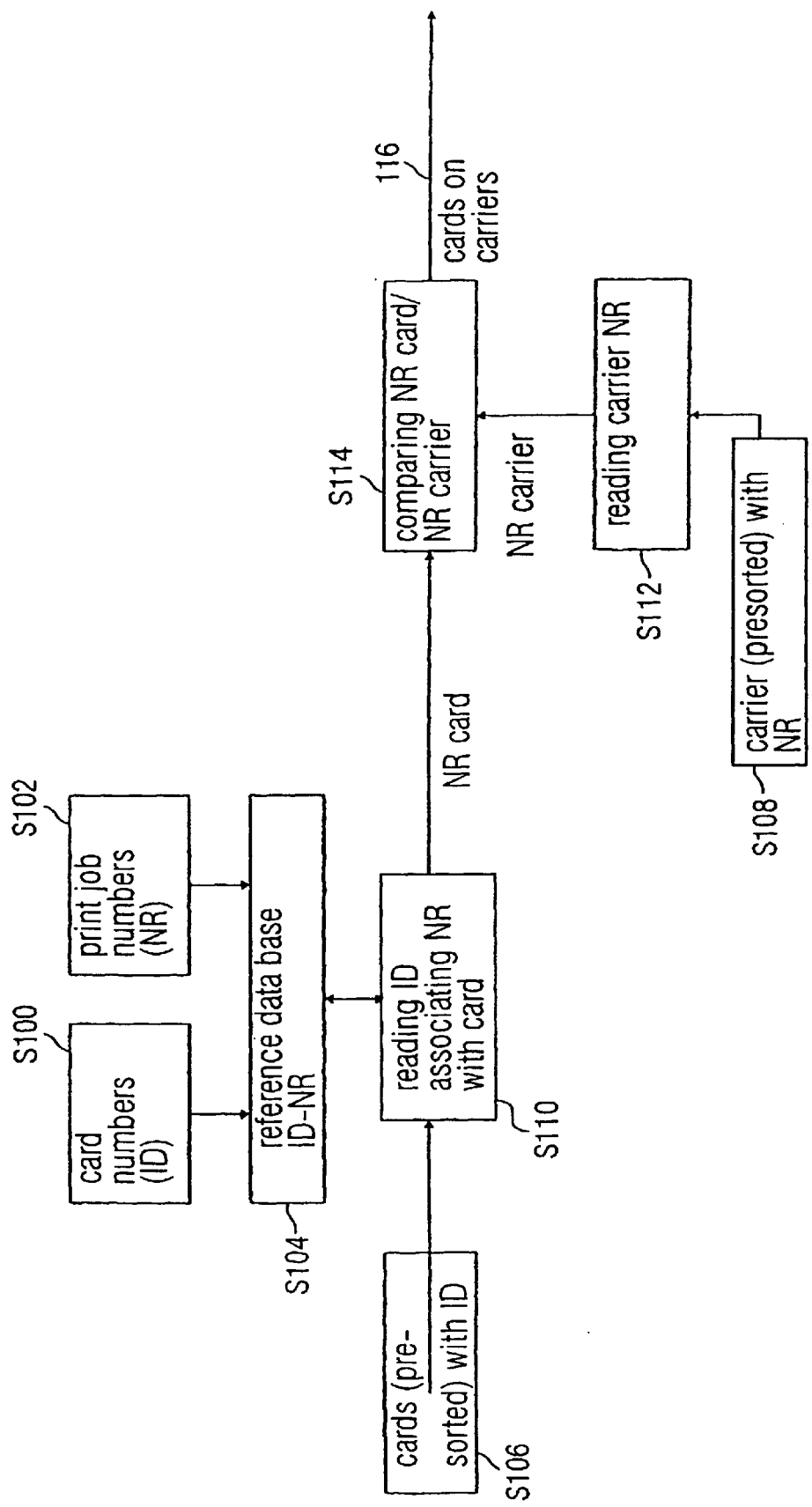
FIG. 1 shows a flow chart representing a first preferred embodiment of the method according to the present invention.

Before a first embodiment will be described in detail hereinbelow on the basis of FIG. 1, the concept underlying the present invention will first be described in detail.

Instead of using an on-line system for connecting plastic cards and card carriers, which has already been described hereinbefore, the present invention permits an off-line operation in the case of which the identification marks of the plastic cards, e.g. the card numbers, are not used for determining a correspondence with the card carriers. This guarantees also in off-line systems that the data related to specific persons in a data base cannot be abused in any way, since a print job number is now used instead of the identification mark of the plastic card; this print job number is not unequivocally associated with the data related to specific persons.

The plastic cards to be processed in a bringing together and joining system for plastic cards and card carriers are personalized by a user or they are obtained in an already personalized form and held ready in the personalization sequence for processing in the system. In the most general case, the personalization consists of an identification mark (ID), such as a card number, which is unique and which comprises various items of information, such as information concerning the customer, applications, functions, branches and the like. A data set or data file of the identification marks and card numbers, respectively, is provided in this way. From an abstract point of view, the card number can also be replaced by a name, an alphanumeric character sequence or other identification codes, as long as the characteristic features are unequivocal. For printing the card carriers, print job numbers (NR) are assigned by a user or by the user's customer placing an order for the printing of card carriers. The basis for the printing sequence is then the above-described data file of card numbers. It is, however, also possible to select an arbitrary sequence of the print job numbers with regard to the sequence of cards; this will, however, necessitate for each off-line processing a presorted sequence of card carriers, as in the case of the plastic cards themselves.

An important point is, however, in general that each print job number only appears once in a batch of cards and carriers to be processed. It is also possible to use print job numbers which provide the user with a list of the complete production, whereby it is fundamentally guaranteed to the user that each print job number has been used only once. In addition, the user will be provided with an automatic survey of his production volume in this way.

The identification marks and card numbers, respectively, and the print job numbers are associated with one another in a data set, and the user provides this data set or data file. This data set is referred to as reference data file ID-NR in the following, and the user makes it available to the method and the apparatus, respectively. The presorted plastic cards are then supplied and a card number of the card is read. The print job number belonging to the card number or identification mark is searched for in the reference data file ID-MR and associated with the card. Presorted carriers are supplied and the print job number of each carrier is read. Both the card and the carrier are held ready in the applicator station and the print job number of the carrier is compared with the print job number of the card. If the print job numbers correspond, the card will be secured to the carrier and the carrier will be advanced for further processing.

In FIG. 1, a first preferred embodiment of the method according to the present invention is shown in detail. The card numbers and the print job numbers are first provided in a step S100 and in a step S102 and the reference data file is produced in a step S104, the reference data file containing the association of the identification mark with the print job number. Instead of the above-described steps, the reference data file can also be produced externally and provided for the method. In a step S106, presorted plastic cards with an identification mark are provided, and in a step S108 presorted card carriers are provided, which have printed thereon a print job number. In step S110, the identification mark or card number of the plastic card which is about to be joined is read, and, by accessing the reference data file, the card has additionally associated therewith a print job number in step S110. In step S112, the print job number provided on the card carrier which is about to be joined is read, and in step S114 the print job numbers of the plastic card and of the carrier are compared. If the print job numbers correspond, the plastic card and the card carrier are joined and, if desired, moved on so that they can be subjected to further processing, as indicated by the arrow 116.

Instead of the above-described association of a print job number with the card which is about to be joined in step S110, the comparison of the print job numbers which would then have to be carried out in step S114 can, in accordance with a further embodiment, be replaced by the step of determining whether the plastic card and the card carrier match one another, this being done by accessing the data set by means of the identification mark and by determining whether the print job number associated with this data set of the identification mark corresponds to the print job number printed on the card carrier.

Figure 2:
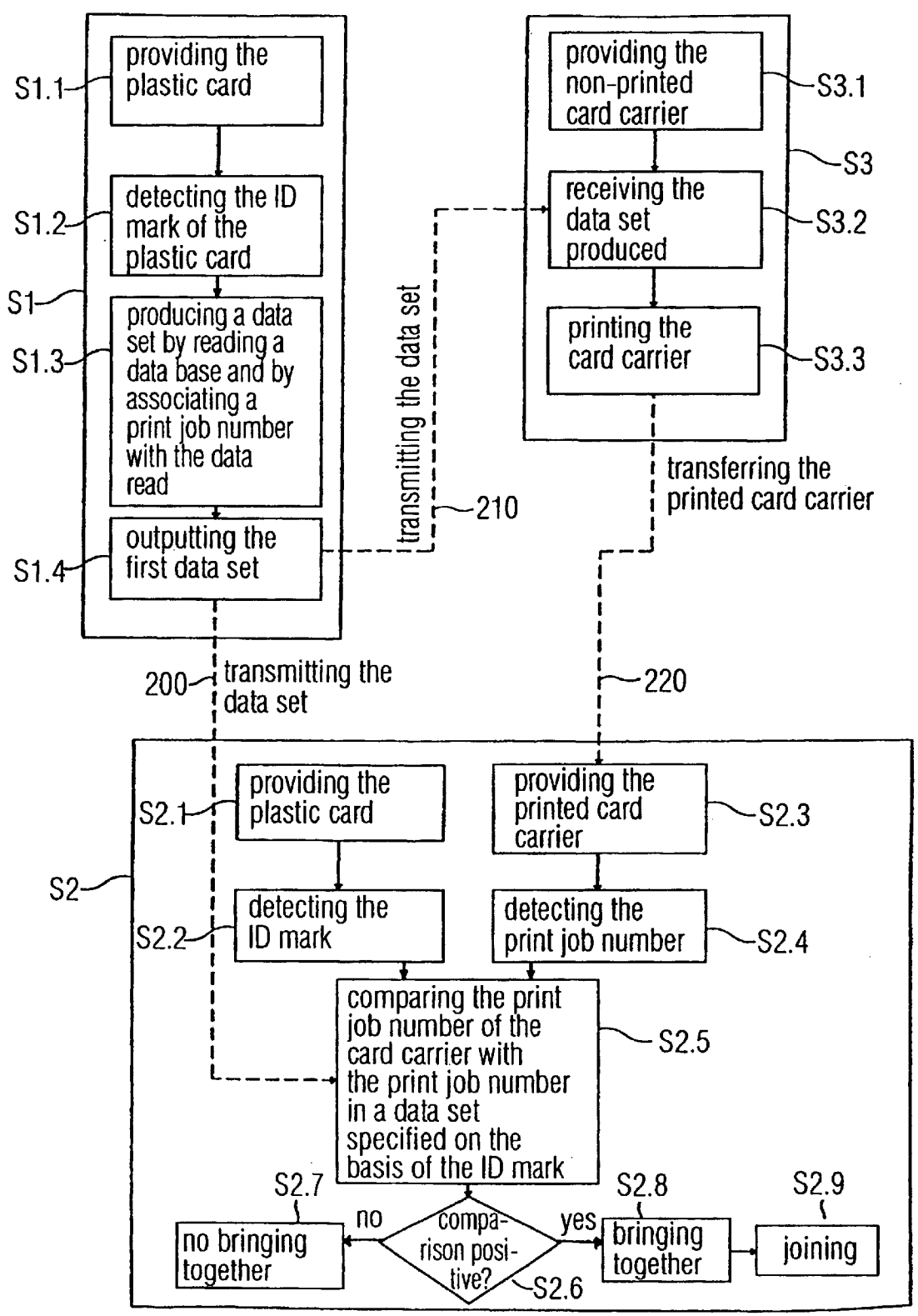
FIG. 2 shows a flow chart representing the method of the present invention according to further preferred embodiments.

Making reference to FIG. 2, a second and a third embodiment of the present invention will be described in detail in the following.

The method according to the present invention representing the second embodiment comprises a first main step S1 for producing a data set and a second main step S2 for bringing together and joining a plastic card and a card carrier.

In the main step S1, a plastic card is first provided in a first step S1.1. In step S1.2, an identification mark provided on the plastic card is detected. Depending on the plastic card provided, this identification mark may, for example, be contained in a magnetic strip or in a chip embedded in the plastic card. The identification mark is read with the aid of known means.

In a subsequent step S1.3, a data set is produced. For this purpose, a data base is accessed by means of the identification mark detected in step S1.2, the data base storing, in dependence upon the identification mark, data related to the owner of the plastic card. The respective set of data of the owner of the plastic card is accessed via the identification mark. Furthermore, the data read have associated therewith a print job number so that the data set produced in step S1.3 comprises in addition to the data related to a specific person the associated print job number. The print job number is not unequivocally associated with the read data related to a specific person, i.e. the print job number permits neither any conclusions to be drawn with regard to nor any relationship to be established with the data of the data base which are related to a specific person. The print job number can, for example, be a randomly produced digit or number, or it can be a cylically recurring number whose repetition rate can by adjusted e.g. in dependence upon the number of plastic cards to be processed. As long as the print job number is not unequivocally associated with the data related to a specific person and as long as it does not permit any conclusions with regard to these data either, also any other kind of mark can be used as a print job mark instead of a number. In this case, e.g. letters or combinations of letters or combinations of letters and digits or graphic or electric or magnetic character combinations can be used as a print job mark.

In a final step S1.4, the data set produced in step S1.3 is outputted.

In the second main step S2, a plastic card is first provided in a step S2.1, and in a step S2.2 the identification mark of the plastic card provided in step S2.1 is detected in a manner similar to that described in connection with step S1.2 in the main step S1. In a step S2.3, a printed card carrier is provided, which is already equipped with the data related to the owner of the plastic card so that e.g. a new plastic card can be forwarded to this owner. Furthermore, the printed card carrier is already provided with a print job number which is detected in a step S2.4 with the aid of a suitable reading device. The print job number can be present on the card carrier in an arbitrary form as long as it can be detected by a reading device in step S2.4. The print job number can, for example, be provided in the form of a combination of digits or an individual digit, a combination of letters or a bar code or similar codes.

With regard to steps S2.1 to S2.4, reference is made to the fact that steps S2.1 and S2.2 as well as steps S2.3 and S2.4 take place essentially parallel to one another, and that the above description does not mean that the sequence of the steps in the form described is to be regarded as invariable.

When the identification mark and the print job number have been detected, a comparison is carried out in a step S2.5. In the comparison, it is determined whether the print job number of the card carrier, which was detected in step 2.4, corresponds to the print job number in a data set specified on the basis of the identification mark read. In order to achieve this, it is necessary that the data set produced by the main step S1 can be accessed in step S2.5. For this purpose, the data set read in step S1.4 can be made available for processing in step S2.5 via a suitable means 200. The means 200 therefore serves to transmit the data set produced in the main step S1 to the main step S2 where it is required in step S2.5 for further processing. The manner in which the data set is transmitted can e.g. be remote data transmission via a network. Alternatively, the data set outputted in step S1.4 can be applied to a data carrier, such as a floppy disk or the like, and by means of this data carrier the data set is made available to step S2.5 in the main step S2.

After the step S2.5, it is examined in a step S2.6 whether the comparison carried out in step S2.5 is positive, i.e. whether the print job numbers correspond. If this is not the case, the plastic card and the printed card carrier are not brought together in step S2.7, and the plastic card and the card carrier are removed in a suitable manner before they are brought together. If it is determined in step S2.6 that the comparison was positive, the plastic card provided and the printed card carrier provided will be brought together and joined in steps S2.8 and S2.9. It follows that the above-described method of bringing together and joining a plastic card and a card carrier comprises the two main steps S1 and S2 described and represents a so-called off-line method in the case of which the production of a data set and the production of a printed card carrier do not take place within a closed system, but in the case of which the data set is e.g. produced according to the main step S1. Also the production of the printed card carrier takes place by means of a suitable system, as will be described in detail in the following, and the bringing together and joining of the card and of the carrier takes place in a further independent system having, in comparison with the above-described known systems, the advantage that it is technically less complicated and that it is therefore less error-prone and causes less costs. It is, for example, not necessary to provide a printer for printing the card carriers and, in addition, a malfunction of the printer does not result in a malfunction of the total system, since all components are separated from one another.

Although, up to now, the method has only been described with regard to the bringing together of one plastic card and of one card carrier, it is obvious that the present invention is not limited to this and that it also comprises the bringing together and the joining of a plurality of card carriers and of a plurality of plastic cards. In this case, it will be necessary that the card carriers are provided in step S2.3 in the sequence in which the identification marks of the plastic cards are detected in step S1.2 of the main step S1 so as to guarantee an adequate bringing together and joining.

On the basis of FIG. 2, the third preferred embodiment of the method according to the present invention will be described in detail in the following. Like the second embodiment, the third embodiment comprises the first and the second main step S1 and S2 and a renewed description of the individual steps is dispensed with. In addition, the method comprises a third main step S3 for producing printed card carriers. In a first step S3.1, a non-printed card carrier is provided. In the step S3.2, the data set produced in the main step S1 is received via a transmission means 210. Like the means 200, the transmission means 210 may be a remote data transmission device, such as a network, or a data carrier. In step S3.3, the card carrier provided in step S3.1 has printed thereon the data from the data set received in step S3.2 as well as the print job number which is also contained in the data set. Subsequently, the printed card carrier is transferred, as indicated by reference numeral 220, so that it is made available in step S2.3 of the main step S2.

As has already been mentioned hereinbefore in connection with the second embodiment, the method is not limited to the joining of one card carrier and of one plastic card in the case of the third embodiment either, but a plurality of card carriers can be joined to a plurality of plastic cards. In this case, the card carriers provided in step S3 should preferably be printed on in the sequence in which the identification marks of the plastic cards are detected in step S1.2 of the main step S1. This sequence results e.g. from the data sets tranmsitted so that at the end of the main step S3 the printed card carriers are present in the sequence in which also the plastic cards have been present during the production of the data set. This will guarantee that the sequences of the plastic cards and of the card carriers, respectively, provided in the main step S2 in step S2.1 and in step S2.2 correspond. On the basis of the print job numbers of the card carriers and the print job numbers associated with the data sets it can then be examined whether the cards and carriers which are about to be joined actually correspond.

Figure 3:
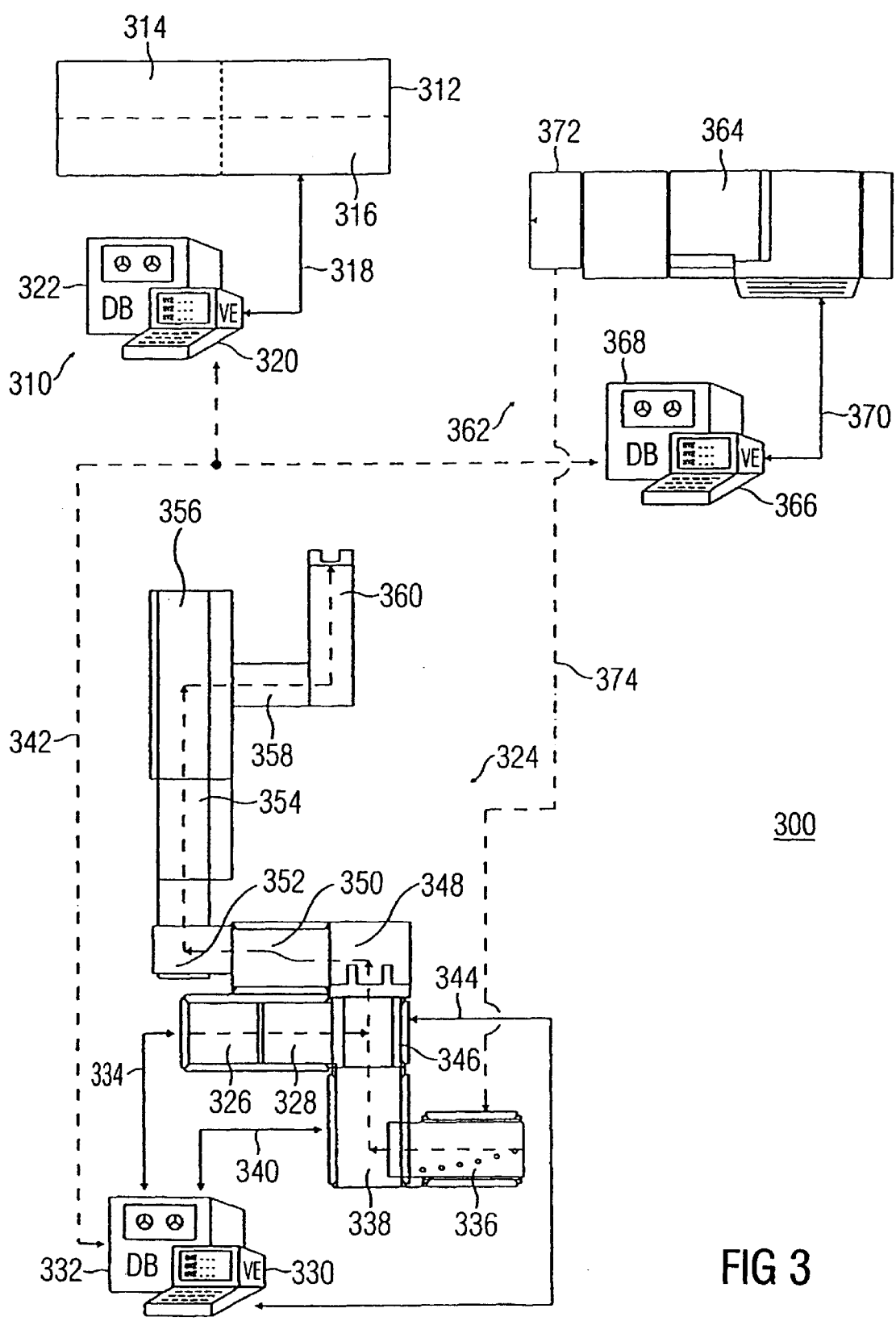
FIG. 3 shows a first embodiment of the apparatus according to the present invention.
Figure 4:
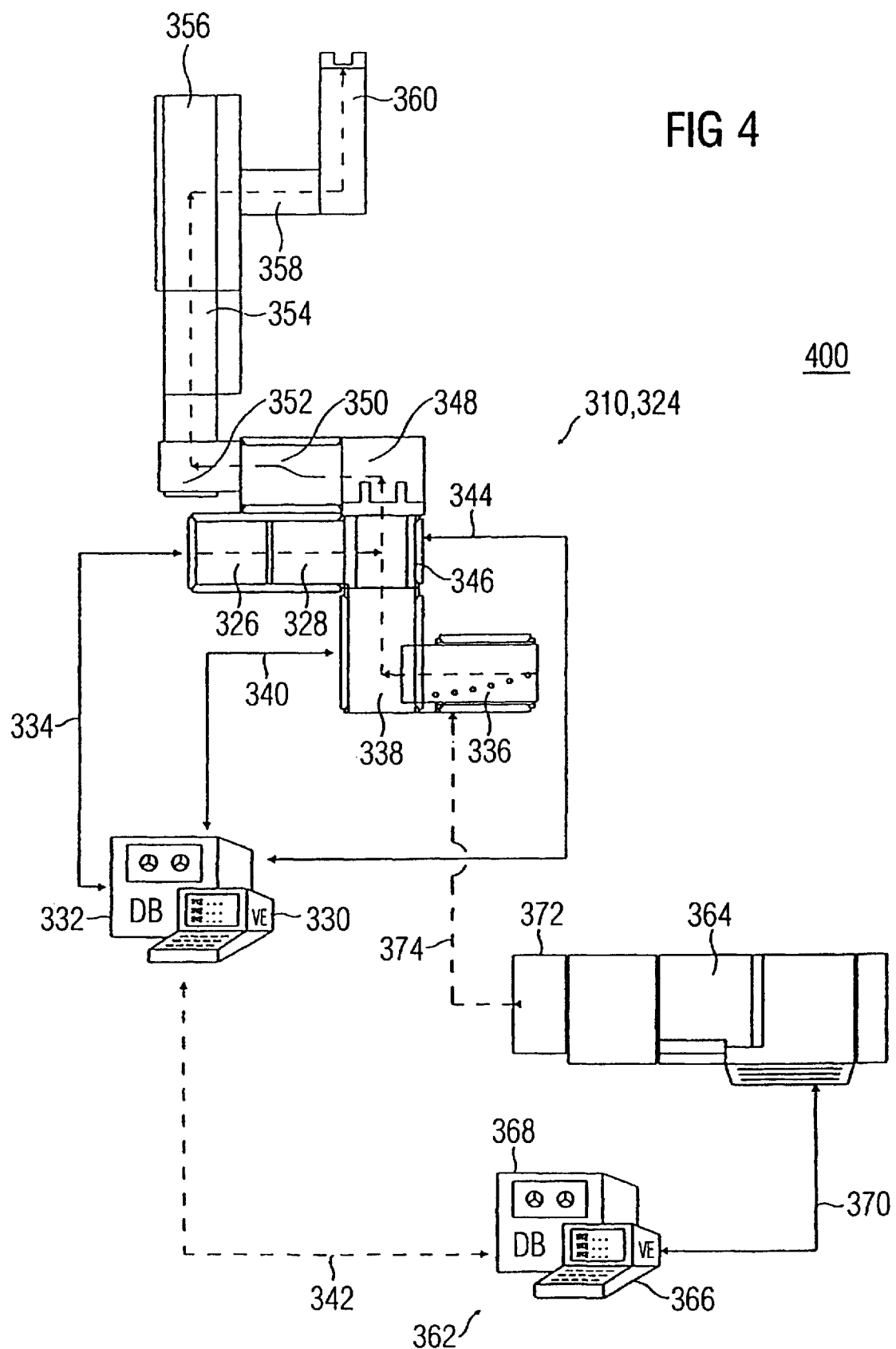
FIG. 4 shows a second embodiment of the apparatus according to the present invention.

In the following, preferred embodiments of the apparatus according to the present invention will be described in more detail making reference to FIGS. 3 and 4. In FIGS. 3 and 4 similar or identical elelements of the apparatus are provided with identical reference numerals.

Making reference to FIG. 3, a first preferred embodiment of the apparatus according to the present invention will be described in the following. When, making reference to FIGS. 3 and 4, a plurality of plastic cards and a plurality of card carriers are referred to in the following, this only serves to describe the preferred embodiments. The apparatus according to the present invention can also be used for a single card and a single carrier.

The apparatus according to the embodiment in FIG. 3 is designated generally by reference numeral 300 and comprises a first means 310 for producing a data set. The means 310 comprises a first component 312 including a carrier means 314 and a detection means 316. The carrier means 314 contains the plastic cards, the identification marks of these plastic cards being read with the aid of the detection means 316. Depending on the way in which the identification mark is present on the plastic card, e.g. in a magnetic strip or in a chip, a suitable reading device is used for reading the identification mark.

The detection means 316 communicates via a data line 318 with a processing means 320, which can be implemented e.g. as a personal computer or as part of a mainframe computer. The processing unit 320 has associated therewith a data base 322 having stored therein data related to specific persons with regard to the plastic cards in the carrier means 314 in dependence upon the identification mark. By means of the detected identification mark transmitted via the data line 318 to the processing unit 320, the processing unit 320 causes the data base 322 to be accessed and produces a data set by reading the data base and by associating a print job number to the data read. In the means 310, the individual steps described on the basis of FIG. 2 in the main step S1 are carried out.

The apparatus 300 additionally comprises a bringing together and joining means 324. This means 324 comprises a plastic card holder 326, which can be implemented e.g. in the form of a tower of cards or as a turret means comprising four magazines. From this holder 326, individual cards are supplied to a detection means 328 reading the identification mark present on the plastic card. The detection means 328 is connected to a processing unit 330 with an associated data base 332, as schematically indicated by the arrow 334. The means 324 additionally comprises a reception tray 336 for receiving preprinted card carriers; this reception tray 336 is followed by a further detection means 338 reading the print job number present on the printed card carrier and communicating with the processing unit 330 and the associated data base 332, as schematically indicated by the arrow 340. The processing unit 330 receives from the detection means 328 via the line 334 the identification mark of the plastic card which is about to be joined and determines on the basis of the data set specified by the identification mark detected whether the print job number contained in the specified data set corresponds to the print job number of the printed card carrier, this print job number being received via the line 340 from the reading device 338. For this purpose, it is necessary that the data sets produced by the means 310 are available to the processing unit 330. The processing unit 320 of the means 310 and the processing unit 330 of the means 324 are therefore connected via a data line 342 so that the data sets produced can be transmitted to the bringing together and joining means 324 before the cards and carriers are brought together. The line 342 can be e.g. a remote data transmission line. Instead of a data line, the connection 342 can also be implemented such that the data sets produced are applied to a data carrier in the processing unit 320; this data carrier is then forwarded by courier or by post to the location of the means 324 where it is introduced in the processing unit 330 so as to file the recorded data sets in this processing unit. The processing unit 330 of the means 324 communicates via a data line 344 with an applicator 346. If the print job numbers of the cards and carriers which are about to be joined correspond, a signal will be outputted via the line 344 to the applicator 346, and this will have the effect that the card carrier and the plastic card are brought together and joined.

In the embodiment shown in FIG. 3, the plastic card and the carrier which are now joined can be subjected to additional processing steps. The applicator 346 is followed by a rerouting means 348 receiving the card carrier which has the plastic card applied thereto and which has been discharged by the applicator 346. The means 348 transfers the card carrier with the plastic card to a longitudinal folding means 350, which, in turn, supplies this card carrier to a collector station 352. Via a collecting path 354, the card carrier with the plastic card reach a packing and closing unit 356. From this packing and closing unit 356, the card carrier with the plastic card are removed with the aid of a removal means 358, whereupon they are deposited in a scaled band 360 in a scalelike mode of arrangement.

In accordance with a further preferred embodiment of the apparatus according to the present invention, the apparatus 300 additionally comprises a printing unit 362 comprising a printer 364 as well as a processing unit 366 having a data base 368 associated therewith. The printer 364 communicates with the processing unit 366 via a data line 370. Via a data transmission line 342 or by means of a data carrier, the data set or the plurality of data sets produced in the means 310 is inputted in the processing unit 366. The printer 364 prints the data contained in the data set and the print job number contained in the data set on the non-printed card carriers and deposits these printed card carriers in a discharge tray 372 of the printer 364. As soon as all the non-printed card carriers have been printed and deposited in the discharge tray 372, they are forwarded from the discharge tray 372 in the printer 364 to the bringing together and joining means 324, or, to be exact, to the reception tray 336 of this means, as indicated by the broken line 374. The above-described printing unit 362 can also be replaced by printing units implemented as rotary printing systems and other high-capacity printing means, the special structural design of the printing means depending on the number of the card carriers to be processed and on the kind of information to be printed.

As has already been stated hereinbefore, the system 300 also serves to bring together and join a plurality of plastic cards and card carriers. In this case, the card carriers are printed on in the sequence in which the identification marks of the plastic cards are detected in the reading device 316 of the data producing means 310, whereupon they are deposited in the card carrier holder and in the reception tray 336, respectively, in this sequence so that the sequence of the plastic cards and the sequence of the card carriers correspond in accordance with the print job numbers and the data related to a specific person; on the basis of an examination of the correspondence of the print job numbers, it is again made sure that these card carriers and plastic cards actually belong together before the joining step is carried out.

On the basis of FIG. 4, a further preferred embodiment of the present invention is described in detail. As can be seen from FIG. 4, the apparatus 400 essentially comprises the same elements which have already been described on the basis of FIG. 3. A renewed description of these components is therefore dispensed with. The difference between the embodiment described with reference to FIG. 3 and the embodiment of the apparatus shown in FIG. 4 is that, instead of a separate device for producing a data set, which is designated in FIG. 3 by reference numerals 310, the system 400 first uses the processing unit 330 and the associated data base 332 as well as the plastic card holder 326 and the reading device 328 for producing, in the manner described hereinbefore, data sets with associated print job numbers with regard to the individual plastic cards. In the manner which has already been described with reference to FIG. 3, these data sets are transmitted to the printing unit 362 which prints the data and the print job numbers onto non-printed card carriers. For the purpose of bringing together and joining, the plastic cards are again introduced in the holder 326 and the printed card carriers are introduced in the reception means 336 whereupon the joining step is carried out in the manner described hereinbefore.

With regard to the embodiments of the apparatus according to the present invention shown in FIG. 3 and 4, it is pointed out that, if the method executed is the method that has been described on the basis of FIG. 1, it is not necessary that all the components shown in FIG. 3 and 4 are provided. For executing the method which has been described on the basis of FIG. 1, it will actually suffice to use only the bringing together and joining means 324 which contains the reference data file ID-MR in its processing unit 330 with the associated data base 332 and which has made available thereto the plastic cards and the printed card carriers, respectively, in the card tower 326 and in the reception tray 336 in a presorted sequence. The identification mark of the plastic card and the print job number of the card carrier which is about to be joined are then read via the reading devices 328 and 338, and, via the processing unit 330, it is determined whether the plastic card which is about to be joined and the card carrier match one another; this is determined either on the basis of a print job number associated with the plastic card by means of the processing unit 330 and the reference data file or on the basis of the data sets in the reference data file, which are accessed only by means of the identification mark.

Other than in the case of the above-described embodiments, a further embodiment offers the possibility of a user providing the data sets with the identification numbers, the personal data and the print job numbers and passing these data on to third parties via suitable data carriers so as to produce the personalized card carriers as well as the personalized plastic cards. After receipt of the personalized card carriers and plastic cards, these card carriers and plastic cards can then be brought together and joined either by the user or by another third party making use of the method according to the present invention.

Such a situation may occur e.g. in health insurance and financial institutions which do not have any possibilities of bringing together and joining card carriers (e.g. accompanying letters) and plastic cards (e.g. insurance cards or credit cards). These enterprises store the necessary data (e.g. card owner) in a data base and produce the data sets making use of this data base and, in addition, they associate the identification marks (unless these identification marks are already part of the data set) and the print job numbers with these data sets. The data sets thus produced are then forwarded by the financial institution or the health insurance institution e.g. to a printing shop which produces the personalized card carriers. The data sets are simultaneously forwarded to a plastic card manufacturer who manufactures the personalized plastic cards. The carriers and cards produced in this way are then forwarded to another enterprise which will join the carriers and the cards and which will also be able to carry out the other processing steps required, such as enveloping and dispatching. It goes without saying that individual ones or all the above-mentioned steps (production of the personalized carriers, production of the personalized cards, bringing together and joining) can also be carried out by a single supplier instead of being carried out at three different locations. Also in this case, the bank, for example, only provides the data sets.

What is claimed is:

1. A method of bringing together and joining plastic cards, which are provided with an identification mark, and printed card carriers associated with the respective plastic cards, data sets with the identification marks, which are associated with the plastic cards, and with a print job number associated with each identification mark being provided, said method comprising the following steps:
   providing in order the plastic cards;
   providing in order the printed card carriers which have already printed thereon a print job number;
   detecting the identification mark of a plastic card;
   detecting the print job number of a card carrier;
   determining on the basis of the data set whether the plastic card which is about to be joined and the card carrier match one another; and
   if said plastic card and the card carrier match one another, bringing them together and joining them.

2. A method of bringing together and joining plastic cards, which are provided with an identification mark, and printed card carriers associated with the respective plastic cards, said method comprising the following steps:
   providing data sets with identification marks which are associated with the plastic cards;
   associating a print Job number with each data set;
   providing in order the plastic cards;
   providing in order the printed card carriers which have already printed thereon a print job number;
   detecting the identification mark of a plastic card;
   detecting the print job number of a card carrier;
   determining on the basis of the data set whether the plastic card which is about to be joined and the card carrier match one another; and
   if said plastic card and the card carrier match one another, bringing them together and joining them.

3. A method of bringing together and joining plastic cards, which are provided with an identification mark, and printed card carriers associated with the respective plastic cards, said method comprising the following steps:
   providing data sets with identification marks which are associated with the plastic cards;
   associating a print job number with each data set;
   providing in order the plastic cards;
   providing in order the printed card carriers which have already printed thereon a print job number;
   detecting the identification mark of a plastic card;
   associating, on the basis of the data set, the print job number with the plastic card whose identification mark has been detected;
   detecting the print job number of a card carrier;
   determining, on the basis of the print job number, whether the plastic card which is about to be joined and the card carrier match one another; and
   if said plastic card and the card carrier match one another, bringing them together and joining them.

4. A method of bringing together and joining plastic cards, which are provided with an identification mark, and printed card carriers associated with the respective plastic cards, said method comprising the following steps:
   a) a data set production step comprising the following steps:
      a1) providing the plastic card;
      a2) detecting an identification mark of the plastic card; and
      a3) producing a data set by reading a data base by means of the identification mark and associating a print job number with the data read from the data base, said print job number being not unequivocally associated with the read data related to a specific person; and b) a bringing-together and joining step comprising the following steps:
b1) providing a printed card carrier which has already printed thereon a print job number;
b2) providing the plastic card;
b3) detecting the print job number of the printed card carrier;
b4) detecting the identification mark of the plastic card;
b5) determining, on the basis of the data set specified by the identification mark, whether the print job number contained in the specified data set corresponds to the detected print job number of the printed card carrier; and
b6) if the print job numbers correspond, bringing the plastic card and the card carrier together and joining them.

5. A method of bringing together and joining plastic cards, which are provided with an identification mark, and printed card carriers associated with the respective plastic cards, aid method comprising the following steps:

a) a data set production step comprising the following steps:
a1) providing the plastic card;
a2) detecting an identification mark of the plastic card; and
a3) producing a data set by reading a data base by means of the identification mark and associating a print job number with the data read from the data base, said print job number being not unequivocally associated with the read data related to a specific person;

b) providing a non-printed card carrier;
c) printing data from the data set produced and the associated print job number on the card carrier; and
d) a bringing-together and joining step comprising the following steps:
d1) providing a printed card carrier which is provided with a print job number;
d2) providing the plastic card;
d3) detecting the print job number of the printed card carrier;
d4) detecting the identification mark of the plastic card;
d5) determining, on the basis of the data set specified by the identification mark, whether the print job number contained in the specified data set corresponds to the detected print job number of the printed card carrier; and
d6) if the print job numbers correspond, bringing the plastic card and the card carrier together and joining them.

6. A method of bringing together and joining plastic cards, which are provided with an identification mark, and printed card carriers associated with the respective plastic cards, said method comprising the following steps:

a) a data set production step comprising the following steps:
a1) providing the plastic card;
a2) detecting an identification mark of the plastic card; and
a3) producing a data set by reading a data base by means of the identification mark and associating a print job number with the data read from the data base, said print job number being not unequivocally associated with the read data related to a specific person; and b) a bringing-together and joining step comprising the following steps:
b1) providing a printed card carrier which is provided with a print job number;
b2) providing the plastic card;
b3) detecting the print job number of the printed card carrier;
b4) detecting the identification mark of the plastic card;
b5) determining, on the basis of the data set specified by the identification mark, whether the print job number contained in the specified data set corresponds to the detected print job number of the printed card carrier; and
b6) if the print job numbers correspond, bringing the plastic card and the card carrier together and joining them;

wherein a plurality of plastic cards and card carriers is brought together and joined, the card carriers being produced and provided in the sequence in which the identification marks of the plastic cards are detected.

7. A method according to claim 4, wherein the print job number is a cyclically recurring number.

8. An apparatus for bringing together and joining plastic cards, which are provided with an identification mark, and printed card carriers associated with the respective plastic cards, comprising:

a means for providing in order the plastic cards;
a means for providing in order the printed card carrier which have already printed thereon a print job number;
a first detection means detecting the identification mark of a plastic card;
a second detection means detecting the print job number of a card carrier;
a processing unit containing data sets with identification marks, a print job number being associated with each data set, and the processing unit determining on the basis of said data set whether the plastic card which is about to be joined and the card carrier match one another; and
a bringing-together and joining means which brings the plastic card and the card carrier together and joins them if said plastic card and said card carrier match one another.

9. An apparatus for bringing together and joining plastic cards, which are provided with an identification mark, and printed card carriers associated with the respective plastic cards, comprising:

a means for providing in order the plastic cards;
a means for providing in order the printed card carriers which have already printed thereon a print job number;
a first detection means detecting the identification mark of a plastic card;
a second detection means detecting the print job number of a card carrier;
a processing unit containing data sets with identification marks, a print job number being associated with each data set, and the processing unit associating a print job number on the basis of the data set of the plastic card whose identification mark has been detected and determining whether the print job numbers of the plastic card and of the card carrier match one another; and
a bringing-together and joining means which brings the plastic card and the card carrier together and joins them if said plastic card and said card carrier match one another.

10. An apparatus for bringing together and joining plastic cards, which are provided with an identification mark, and printed card carriers associated with the respective plastic cards, comprising:
- a mean for producing a data set having the following features:
  - a carrier means in which the plastic card is contained;
  - a detection means which detects the identification mark of the plastic card;
  - a data base means containing data in dependence upon the identification mark; and
  - a processing unit causing the data base to be accessed by means of the identification mark and producing a data set by reading the data base and by associating a print job number with the data read;
- a bringing-together and joining means having the following features:
  - a plastic card holder in which the plastic card is contained;
  - a card carrier holder in which a printed card carrier is contained, said printed card carrier having already printed thereon a print job number;
  - a means for detecting the print job number on the printed card carrier;
  - a means for detecting the identification mark of the plastic card;
  - a processing unit determining, on the basis of the data set specified by the detected identification mark, whether the print job number contained in the specified data set corresponds to the print job number of the printed card carrier; and
  - a means which brings the plastic card and the card carrier together and joins them if the print job numbers correspond.

11. An apparatus for bringing together and joining plastic cards, which are provided with an identification mark, and printed card carriers associated with the respective plastic cards, comprising:
- a means for producing a data set having the following features:
  - a carrier means in which the plastic card is contained;
  - a detection means which detects the identification mark of the plastic card;
  - a data base means containing data in dependence upon the identification mark; and
  - a processing unit causing the-data base to be accessed by means of the identification mark and producing a data set by reading the data base and by associating a print job number with the data read;
- a bringing-together and joining means having the following features:
  - a plastic card holder in which the plastic card is contained;
  - a card carrier holder in which a printed card carrier is contained, said printed card carrier being provided with a print job number;
  - a means for detecting the print job number on the printed card carrier;
  - a means for detecting the identification mark of the plastic card;
  - a processing unit determining, on the basis of the data set specified by the detected identification mark, whether the print job number contained in the specified data set corresponds to the print job number of the printed card carrier; and
  - a means which brings the plastic card and the card carrier together and joins them if the print job numbers correspond; and
- a printing unit having the following features:
  - a means containing a non-printed card carrier; and
  - a means printing data from the produced data set and the associated print job number on a non-printed card carrier.

12. An apparatus for bringing together and joining plastic cards, which are provided with an identification mark, and printed card carriers associated with the respective plastic cards, comprising:
- a means for producing a data set having the following features:
  - a carrier means in which the plastic card is contained;
  - a detection means which detects the identification mark of the plastic card;
  - a data base means containing data in dependence upon the identification mark; and
  - a processing unit causing the-data base to be accessed by means of the identification mark and producing a data set by reading the data base and by associating a print job number with the data read; and
- a bringing-together and joining means having the following features:
  - a plastic card holder in which the plastic card is contained;
  - a card carrier holder in which a printed card carrier is contained, said printed card carrier being provided with a print job number;
  - a means for detecting the print job number on the printed card carrier;
  - a means for detecting the identification mark of the plastic card;
  - a processing unit determining, on the basis of the data set specified by the detected identification mark, whether the print job number contained in the specified data set corresponds to the print job number of the printed card carrier; and
  - a means which brings the plastic card and the card carrier together and joins them if the print job numbers correspond;

wherein a plurality of plastic cards and card carriers is brought together and joined, the card carriers being printed on in the sequence in which the identification marks of the plastic cards are detected and being contained in the card carrier holder.

13. An apparatus according to claim 10, wherein the print job number is a cyclically recurring number.

* * * * *